United States Patent
Tillier (10) Patent No.: US 6,421,742 B1
(45) Date of Patent: Jul. 16, 2002

(54) METHOD AND APPARATUS FOR EMULATING AN INPUT/OUTPUT UNIT WHEN TRANSFERRING DATA OVER A NETWORK

(75) Inventor: Fabian S. Tillier, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/430,308

(22) Filed: Oct. 29, 1999

(51) Int. Cl.$^7$ ................................................ G06F 3/00
(52) U.S. Cl. ............................. 710/1; 710/11; 710/33; 710/61; 709/201; 709/232
(58) Field of Search .......................... 710/1, 4, 5, 7, 710/11, 15, 20, 33, 35, 36, 52, 61, 65, 128; 709/200, 201, 232

(56) References Cited

U.S. PATENT DOCUMENTS

| | | | | |
|---|---|---|---|---|
| 4,858,114 A | * | 8/1989 | Heath et al. | 364/200 |
| 5,701,516 A | * | 12/1997 | Cheng et al. | 710/22 |
| 5,778,189 A | * | 7/1998 | Kimura et al. | 709/236 |
| 5,859,981 A | * | 1/1999 | Levin et al. | 709/238 |
| 6,035,327 A | * | 3/2000 | Buckley et al. | 709/206 |
| 6,128,679 A | * | 10/2000 | Beale et al. | 710/62 |
| 6,321,279 B1 | * | 11/2001 | Bonola | 710/36 |

\* cited by examiner

Primary Examiner—Jeffrey Gaffin
Assistant Examiner—Rijue Mai
(74) Attorney, Agent, or Firm—Antonelli, Terry, Stout & Kraus, LLP (57) ABSTRACT

In an example embodiment, a method of transferring data to or from an input/output unit across a network emulates a message passing protocol. A message sent from a host device to the input/output unit specifies the requested data transfer and is formatted in accordance with the message passing protocol. An emulation service software layer on the input/output unit translates the message into a corresponding series of data transfer operation instructions. The series of data transfer operation instructions have a different format than the format of the message passing protocol. The data transfer specified by the message is carried out by the operating system and hardware of a target device in the input/output unit using the series of data transfer operation instructions. After the data transfer is completed, a reply message is created in the emulation service software layer and the reply message is sent to the host device in a format according to the message passing protocol.

20 Claims, 10 Drawing Sheets

```
PROCESSCONFIGURATIONREQUEST()
{
    IF REQUEST TYPE IS
    {
    GET NUMBER IOPS
        PREPARE REPLY I2O MESSAGE.
            ALLOCATE REPLY MESSAGE.
            FORMAT REPLY MESSAGE WITH INFORMATION FROM THE REQUEST.
                POINTER TO CALLBACK FUNCTION
                INITIATOR ADDRESS
                TARGET ADDRESS
                TRANSACTION CONTEXT
            REPORT ON IOP IN THE REPLY'S PAYLOAD
            CALLBACK CALLER VIA POINTER TO CALLBACK FUNCTION.
            FREE REPLY MESSAGE.
        RETURN
            ACKNOWLEDGE THE RECEPTION OF THE REQUEST.

GET LOGICAL CONFIGURATION TABLE
        BUILD LOGICAL CONFIGURATION TABLE (LCT) IN BUFFER PROVIDED
            MAP REQUEST'S BUFFER INTO SYSTEM'S VIRTUAL MEMORY SPACE.
            USING BUFFER PROVIDED IN REQUEST,
                CREATE LCT WITH FIRST ENTRY FOR THE EMULATE IOP.
                FOR EACH DEVICE,
                    ADD AN ENTRY TO THE LCT WITH DEVICE'S PARAMETERS.
            UNMAP REQUEST'S BUFFER FROM SYSTEM'S VIRTUAL MEMORY SPACE.

PREPARE REPLY I2O MESSAGE
            ALLOCATE REPLY MESSAGE.
            FORMAT REPLY MESSAGE WITH INFORMATION FROM THE REQUEST.
                POINTER TO CALLBACK FUNCTION
                INITIATOR ADDRESS
                TARGET ADDRESS
                TRANSACTION CONTEXT
            CALLBACK CALLER VIA POINTER TO CALLBACK FUNCTION.
            FREE REPLY MESSAGE.

RETURN
            ACKNOWLEDGE THE RECEPTION OF THE REQUEST.
```

FIG. 4B

```
GET DEVICE PARAMETERS
    ERROR CHECKING
        VALIDATE THE TARGET ADDRESS
    DECODE THE I₂O MESSAGE
        GET THE DEVICE OBJECT FOR THE TARGET SPECIFIED IN THE REQUEST MESSAGE.
        DETERMINE WHICH PARAMETERS ARE REQUESTED:
            DEVICE_INFO
            OPERATIONAL_CONTROL
            POWER_CONTROL
            CACHE_CONTROL
            MEDIA_INFO
            SGL_OPERATING_LIMITS
    PREPARE REPLY I₂O MESSAGE
        ALLOCATE REPLY MESSAGE.
        FORMAT REPLY MESSAGE WITH INFORMATION FROM THE REQUEST.
            POINTER TO CALLBACK FUNCTION
            INITIATOR ADDRESS
            TARGET ADDRESS
            TRANSACTION CONTEXT
        FORMAT REPLY'S PAYLOAD WITH SPECIFIED DEVICE'S PARAMETERS.
        CALLBACK CALLER VIA POINTER TO CALLBACK FUNCTION.
        FREE REPLY MESSAGE.
    RETURN
        ACKNOWLEDGE THE RECEPTION OF THE REQUEST.
CLAIM/CLAIM RELEASE DEVICE
    ERROR CHECKING
        VALIDATE THE TARGET ADDRESS
    PREPARE REPLY I₂O MESSAGE
        ALLOCATE REPLY MESSAGE.
        FORMAT REPLY MESSAGE WITH INFORMATION FROM THE REQUEST.
            POINTER TO CALLBACK FUNCTION
            INITIATOR ADDRESS
            TARGET ADDRESS
            TRANSACTION CONTEXT
        SET/RESET SPECIFIED DEVICE'S CLAIM STATUS.
        CALLBACK CALLER VIA POINTER TO CALLBACK FUNCTION TO ACKNOWLEDGE REQUEST.
        FREE REPLY MESSAGE.
    RETURN
        ACKNOWLEDGE THE RECEPTION OF THE REQUEST.

GENERATEIOREQUEST (I2O REQUEST MESSAGE)
{

ERROR CHECKING
    VALIDATE THE TARGET ADDRESS
    VALIDATE THE TYPE OF SCATTER-GATHER LIST (SGL)

DECODE THE I2O MESSAGE
    GET THE DEVICE OBJECT FOR THE TARGET SPECIFIED IN THE REQUEST MESSAGE.
    VERIFY THAT THE TRANSFER LENGTH IS A MULTIPLE OF THE TARGET DEVICE'S BLOCK SIZE.
    VERIFY THAT THE LOGICAL BLOCK ADDRESS (LBA) IS VALID.

GET THE PHYSICAL ADDRESS OF THE START OF THE BUFFER FROM THE SGL.
CALCULATE THE OFFSET FROM THE MEMORY PAGE BOUNDARY OF THE START OF THE BUFFER.
CALCULATE THE NUMBER OF PAGES THIS TRANSFER CROSSES.

PREPARE REPLY I2O MESSAGE
    GET AN I2O REPLY MESSAGE FROM PRE-ALLOCATED POOL.
    FORMAT REPLY MESSAGE WITH INFORMATION FROM THE REQUEST.
        POINTER TO CALLBACK FUNCTION
        INITIATOR ADDRESS
        TARGET ADDRESS
        TRANSFER BYTE COUNT
        TRANSACTION CONTEXT

FIG. 7B

GENERATE I/O REQUEST
    CREATE OPERATING SYSTEM SPECIFIC ASYNCHRONOUS I/O REQUEST.
    MAP REQUEST'S SGL INTO SYSTEM'S VIRTUAL MEMORY SPACE.
    SET COMPLETION ROUTINE FOR THE I/O.
    SET TYPE OF I/O (READ OR WRITE) BASED ON $I_2O$ REQUEST.
    STORE POINTER TO REPLY MESSAGE IN I/O REQUEST.
    SEND I/O REQUEST TO OPERATING SYSTEM FOR ASYNCHRONOUS PROCESSING.
        I/O IS MARKED PENDING BY OPERATING SYSTEM.

RETURN
    ACKNOWLEDGE THE RECEPTION OF THE REQUEST.

COMPLETIOREQUEST (COMPLETED IO REQUEST)
{
    VERIFY THAT I/O COMPLETED SUCCESSFULLY
        SEND FAILURE REPLY IF I/O FAILED.

SEND REPLY $I_2O$ MESSAGE IF I/O SUCCEEDED
        RETRIEVE REPLY MESSAGE FROM POINTER STORED IN I/O REQUEST.
        CALLBACK CALLER VIA POINTER TO CALLBACK FUNCTION STORED IN REPLY MESSAGE.

CLEAN UP
        UNMAP I/O'S BUFFER FROM SYSTEM'S VIRTUAL MEMORY SPACE.
        FREE I/O REQUEST AND ASSOCIATED RESOURCES.
        RETURN REPLY MESSAGE TO POOL.
}

FIG. 8

METHOD AND APPARATUS FOR EMULATING AN INPUT/OUTPUT UNIT WHEN TRANSFERRING DATA OVER A NETWORK

BACKGROUND

1. Field of the Invention

This invention relates generally to methods and apparatus for transferring data over a network. In particular, the present invention relates to methods and apparatus for emulating an input/output unit when transferring data over a network.

2. Description of the Related Art

Conventional methods of transferring data between a host device, such as a server, and an input/output (I/O) unit, such as a block storage device, utilize a series of simple, basic level, commands sent from the central processing unit (CPU) of the host to the processor in a controller (usually implemented as a slot-based adaptor card) of the I/O unit via an I/O bus such as, for example, a Peripheral Component Interconnect (PCI) synchronous bus as described in the latest version of "PCI Local Bus Specification, Revision 2.1" set forth by the PCI Special Interest Group (SIG) on Jun. 1, 1995. In these methods, the host CPU has to direct each one of the steps taken by the controller of the I/O unit which results in delays in the data transfer and decreases in the performance of the host CPU.

For example, suppose that a host wishes to transfer data from a server to a hard disk via a network. The host CPU first stores the write command and its associated data within a block of host system memory. The host CPU transfers a command to the I/O controller via the I/O bus of the host and the network (a network interface controller (NIC) acts as the communications intermediary between the devices and the network and passes data blocks to and from the network in the speed and manner required by the network). This command tells the I/O controller that a new command has been issued. The I/O controller card must then read the data from system memory using a pointer, which is the value representing an address within the system memory where the data associated with the command can be found. (The pointer may be virtual or physical and the location of the data is not necessarily contiguous with the location of the command. Indeed, the data may be split, requiring a Scatter/Gather List (SGL) to describe the locations of the data.) To get the block of data from the system memory back to the I/O controller may require several separate fetches. The data is then subsequently written from the I/O controller to the hard disk itself. The host CPU must always load the data and the I/O controller must always separately read the write command to know where the data is located and perform the fetches to obtain the data. A similar load/store procedure occurs when a host CPU reads a block of data from the hard disk, i.e., a series of messages passed back and forth so the I/O controller can store the data in a block within the system memory.

Figure 8:
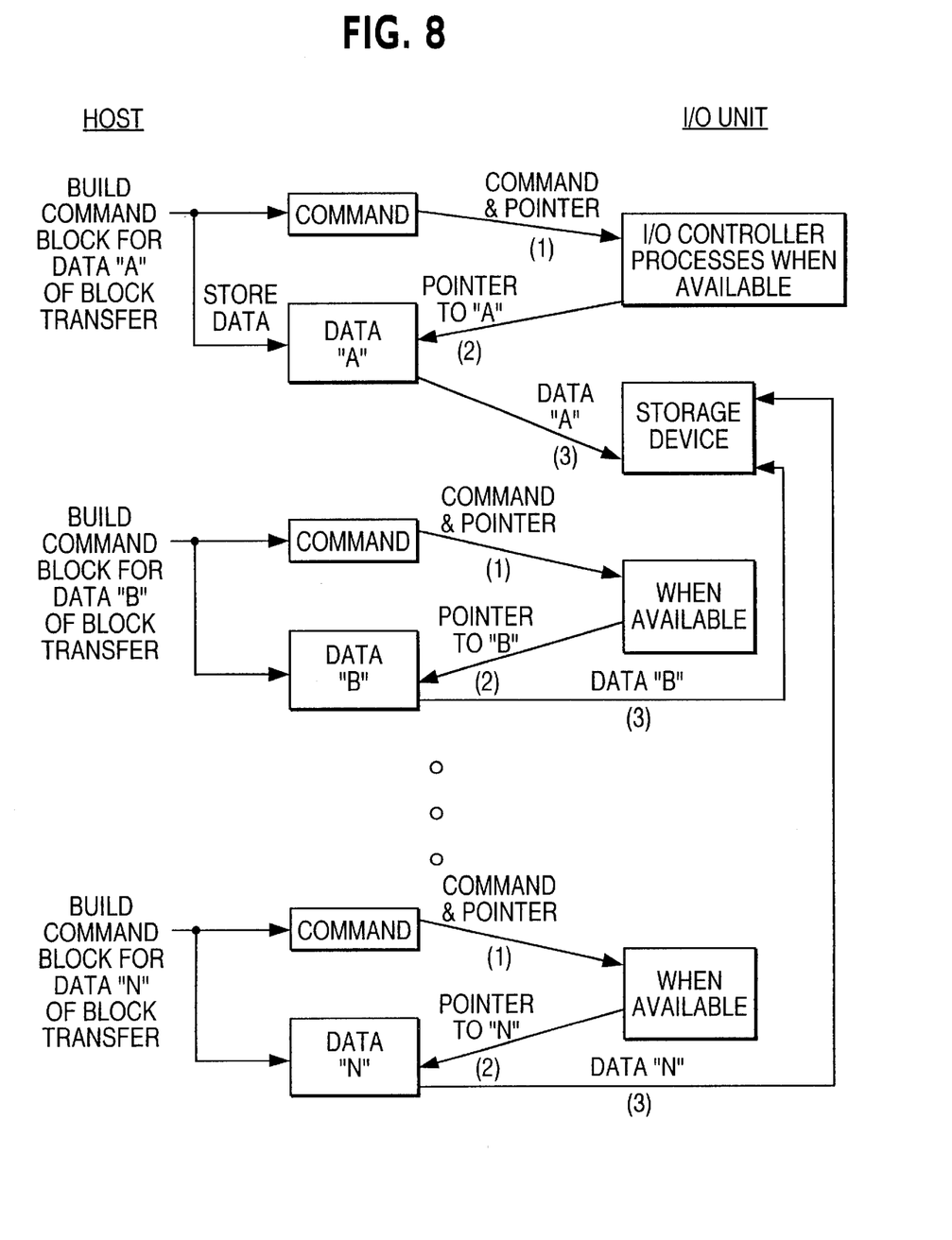
FIG. 8 is a chart illustrating the steps of a conventional data transfer operation in which an I/O data block is transferred from a device on a network.

The repetition of this conventional load/store procedure (illustrated generally in FIG. 8) of sending a command with pointer (step 1), waiting for and receiving a request for data (step 2) and subsequently sending the data in response to the request (step 3) has substantial inherent latencies and delays. Even though the host CPU performs optimally, the performance of the host can still be less than optimum because the procedure is very inefficient. The data transfers slow down the entire system and many CPU cycles will pass before they are completed. Although, the PCI bus architecture provides the most common accepted method used to extend computer systems for add-on arrangements (e.g., expansion cards) with new disk memory storage capabilities, it has performance limitations and scales poorly in server architectures.

A network may have a significant number of I/O devices which are of radically different types, store different kinds of data and/or vary from each other in the addressing sequence by which the data blocks containing the data are written and read out. Although not shown in FIG. 1, transport and other protocols (e.g., TCP, IP) are implemented at various levels of firmware and software in an I/O device to control, distinguish or review the transferred data in order to render the transfer of data over the network more reliable. The multiplexing and demultiplexing processes are computationally expensive and a host CPU must control the movement of the transfer data blocks into and out of the memory controller or I/O controller during the transfer of each data block.

SUMMARY

The present invention is directed to emulation in an I/O unit when transferring data over a network. In an example embodiment, a method of transferring data to or from an input/output unit across a network emulates a message passing protocol. A message sent from a host device to the input/output unit specifies the requested data transfer and is formatted in accordance with the message passing protocol. An emulation service software layer on the input/output unit translates the message into a corresponding series of data transfer operation instructions. The series of data transfer operation instructions have a different format than the format of the message passing protocol. The data transfer specified by the message is carried out by the operating system and hardware of a target device in the input/output unit using the series of data transfer operation instructions. After the data transfer is completed, a reply message is created in the emulation service software layer and the reply message is sent to the host device in a format according to the message passing protocol.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation.

DETAILED DESCRIPTION

Figure 1:
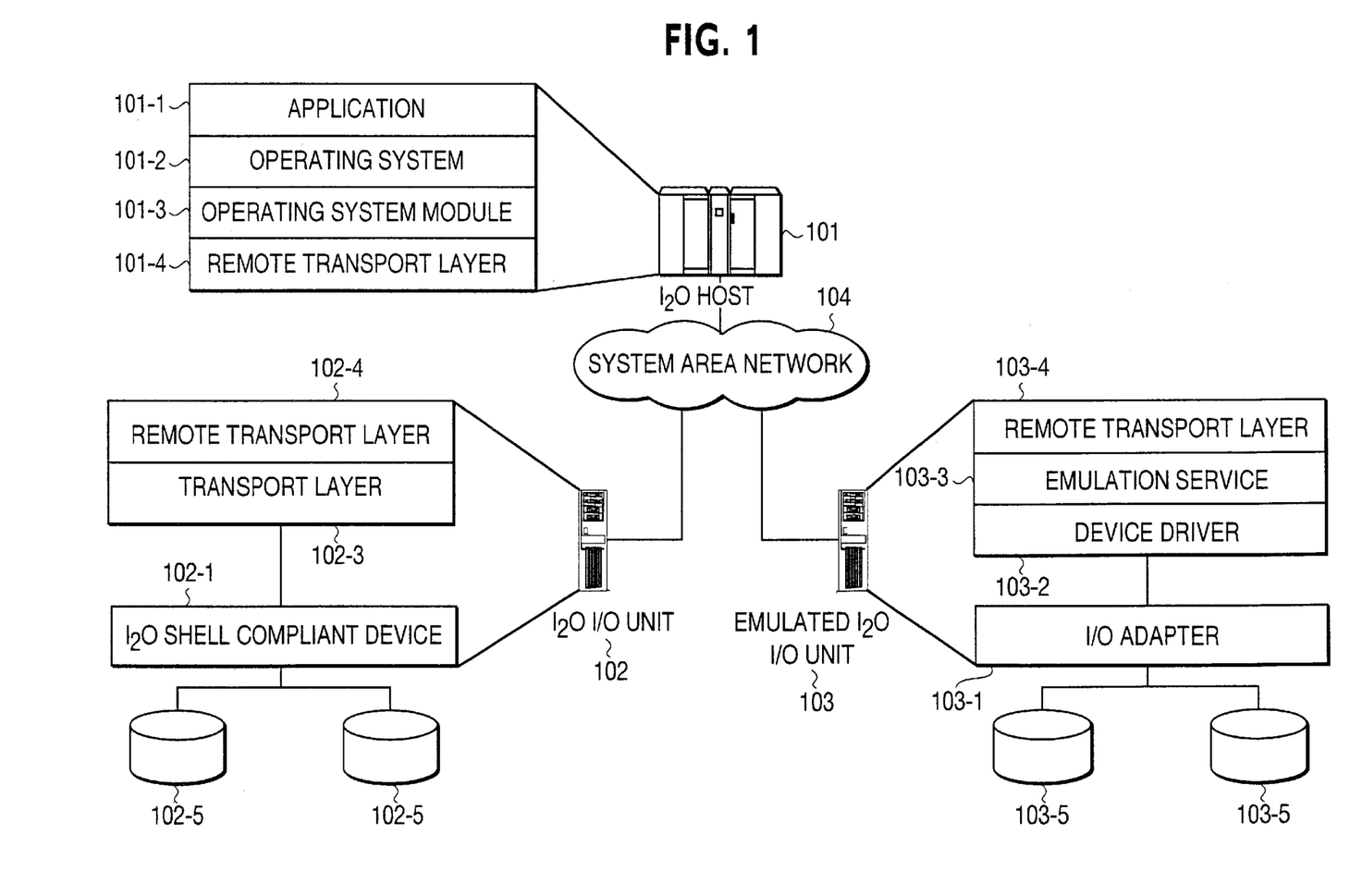
FIG. 1 is a block diagram illustrating the software driver stack in an example embodiment of the invention having a host connected to both a native $I_2O$ I/O unit and an emulated $I_2O$ I/O unit.

New I/O transport technologies are being developed to improve upon the conventional I/O data transfer procedures discussed above in the Description of the Related Art and illustrated generally in FIG. 1. For example, the Next Generation I/O (NGIO) architecture, Version 1.0, published Jul. 22, 1999, and other architectures currently under development, such as System I/O, offer several advantages. These architectures utilize a fabric cluster based networking medium, with new link specifications for transferring data between a server and I/O units out on the fabric rather than to and from I/O devices on system level I/O buses, such as a PCI bus. They decrease the inefficiency of the transfer of I/O data in a server architecture, such as what occurs when an I/O data block is transferred to or from a block storage device such as a hard disk array. In particular, some PCI compliant I/O unit controllers cannot accomplish data transfers without the multiple steps discussed above with relation to FIG. 1. A server is a type of computer system having an architecture or otherwise designed to be able to support multiple I/O devices and to transfer data with other computer systems at high speed. (Due to recent advances in the performance and flexibility of computer systems, many modern computers are servers under this definition.) Although many servers currently utilize PCI buses, the example embodiment of the invention sets forth a data transfer where the transferee device has remote direct memory access (RDMA) to virtual addresses over a system area network (SAN) with a switched fabric configuration, thus enabling protected, target-managed data transfer. There are several commercially available proprietary SAN fabrics, such as GigaNet and ServerNet by Compaq.

The new architectures also allow remote direct memory access so that one device is able to push data across a network into a shared buffer pool of another device and direct data into and from the device's memory. This feature facilitates new message passing standards which pass high level operation messages between the host CPU and I/O unit processor so that the I/O unit processor handles the command and processes it fully, thereby allowing the host CPU to perform processing for other operations. The I/O unit receives and processes many different kinds of messages. The messages generally have the same format and fields in each message identify the initiator, the target, the message function, and other information as necessary. For example, a message passed from a host could instruct the I/O unit to read 1 megabyte of data off a disk in the I/O unit and store the data directly in an address location of the host memory. The controller in the I/O unit accomplishes the entire data transfer from end to end without having to interrupt the host CPU several times as discussed above with relation to FIG. 1. When the last of the data has been transferred into host memory, the controller transfers a reply to the host which indicates that the data transfer is completed and the data is available.

As one example of a message passing standard, the $I_2O$ special interest group (www.$I_2O$sig.org) has released Version 1.5, March 1997, which defines protocols and formats for the messages passed back and forth between the host and the I/O unit. The controller I/O unit is specifically designed to run software which instructs its processor to process $I_2O$ compliant messages without a large number of interrupts to the host CPU. (The example embodiment of this application discusses a method and apparatus of the invention utilizing $I_2O$ messages over a system area network (SAN). The embodiment is not limiting of the invention and is presented in the context of a specific message passing standard in a system are network merely to help show the advantages of the invention. The method and apparatus of the example embodiment of the invention are also applicable to any other message passing standard or non-switched point-to-point connection links to I/O units in other configurations or networks which may currently exist or hereafter be developed.)

Despite new high performance I/O network architectures and message passing, it is difficult for these technologies to become well established because of the need to develop new corresponding I/O units, such as storage devices, and the cost to replace "legacy" I/O units with those newly developed "native" I/O units. The example embodiment of the invention attempts to eliminate much of the difficulty in implementing new network technologies by including an additional software layer in the legacy I/O units so that they emulate the capabilities of a native I/O unit. In this way, I/O units for a completely new network technology can be obtained by using existing stable, high performance I/O device architectures with new I/O message passing and transfer architectures so that development can focus on the I/O data transfer instead of the hardware of the I/O controller.

An example embodiment of the invention is illustrated in the block diagram of FIG. 1. Of course, $I_2O$ host 101 is quite commonly a server, which may have a plurality of CPUs such as an Intel® Pentium® II Xeon™ or Pentium® III Xeon™ processor, a host system bus, a memory controller, system memory, and a host channel adapter (not shown). The host channel adapter (HCA) and target channel adapter (TCA) is, in turn, connected to the switching fabric (not shown), which may contain many different switches SW, of a system area network 104. The switches are preferably multi-stage switches with naturally redundant communication channel links through the fabric such that a plurality of messages can be traveling through the switching fabric at any given time. Each channel link between the HCA and the switches includes a request/response protocol permitting message sends, rDMA read and write, management, and retry on transient errors. Channel links may be grouped together for additional bandwidth. Although only one host, one $I_2O$ compliant I/O unit and one emulated $I_2O$ I/O unit is shown in FIG. 1, the example embodiment of the invention can be applied in a network of different configuration and number of connected devices.

While the example embodiment is an NGIO implementation and thus supports the channel link definition provided in the specification identified above, the present invention is not so limited. In accordance with the implementation in the NGIO specification or similar systems, once injected into the switched fabric SF, the write command travels through the switches and eventually arrives at a target channel adapter TCA where it can be given to an I/O controller where it is subsequently written to the hard disk HD or to a network interface where it is subsequently transferred to another computer device on a connected network (not shown). Accordingly, the inherent delays in deciphering the command and writing of the data as required by the I/O controller are not experienced by the processor P which is on the other side of the switching fabric, and can continue processing. When a CPU issues a read command, for example, it simply passes the command to the host channel adapter which injects it into the switched fabric SF, such that the CPU does not have to wait for processing of the command and locking of the system bus, but instead goes on to perform other processing operation until the processing is completed. According to the present invention, the channel link is any means of transferring data, including but not limited to virtual channels, used to transfer data between two endpoints.

The example embodiment and other embodiments of the invention can be implemented in conjunction with other types of switch fabric-based I/O architectures. The example embodiment NGIO uses a similar model for input/output data transfer as is specified by the VI architecture. VI is described in the Virtual Interface Architecture Specification, Version 1.0, Dec. 16, 1997, jointly authored by Intel Corporation, Microsoft Corporation, and Compaq Computer Corporation, and makes it possible to perform low overhead communication using off-the shelf SAN hardware. The Virtual Interface architecture specification defines a standard interface to a SAN controller such that user applications and kernel applications can move data out onto a SAN with minimal impact on the CPU. It is designated for use in networks, such as SANs, which have very low error rates and high reliability levels. Transport errors are rare and considered catastrophic. The connection is broken when they occur. A highly efficient interface such as the kernel interface in the example embodiment may thus be beneficially used by various computer devices having NGIO hardware connected to a network fabric. However, the example embodiment and other embodiments of the invention may also be used with non-NGIO hardware.

The data transfers to and from the host are optimized through the host channel adapter at all times using the software stack shown in FIG. 1. This stack includes an application layer 101-1, an operating system (such as Windows NT 4.0) 101-2, at least one operating system module (OSM) 101-3, and a remote transport layer 101-4 which controls the host channel adapter so that it transmits bits of data across network 104. In accordance with the example embodiment, OSM 101-3 contains an application programming interface (API) to OS 101-2 which enables it to send and receive $I_2O$ messages.

The $I_2O$ I/O unit 102 has a remote transport layer 102-4 which works in conjunction with remote transport layer 101-4 of host 101. It also has a transport layer 102-3 which prepares data for transfer between an $I_2O$ shell compliant device 102-1, which, for example, is a block storage adapter having various block storage devices 102-5. There are various other software layers which are not shown for the sake of simplicity. The $I_2O$ shell 102-1 is configured to interact with other $I_2O$ devices, such as host 101, to send and receive $I_2O$ messages for accomplishing data transfers. The commands and I/O data are transferred by the I/O unit 102 independently of the host CPU. This helps the CPU or other elements of the host avoid having to expend system resources to accomplish transfer of I/O data blocks since there may be access conflicts with other functions. The $I_2O$ I/O unit 102 is specifically designed to perform $I_2O$ messaging and does not implement the example embodiment of the invention.

On the other hand, I/O unit 103 does not contain an $I_2O$ shell compliant device and is modified to emulate an $I_2O$ device according to the example embodiment of the invention. It also contains a remote transport layer 102-4 which works in conjunction with remote transport layer 101-4 of host 101. I/O adapter 103-1 is a conventional controller and storage devices 103-5 are conventional block storage devices. (Although hard disk drives are illustrated in FIG. 1, the storage devices in I/O units 102 and 103 may be any type of storage device.) Device driver 103-2 is a conventional driver designed to operate in conjunction with the storage controller and without any regard to $I_2O$ messaging. As described in detail below, emulation service layer 103-3 allows the non-$I_2O$ I/O unit to be used as an $I_2O$ I/O unit by translating $I_2O$ requests into operating system specific I/O calls and generating $I_2O$ replies.

Figure 2:
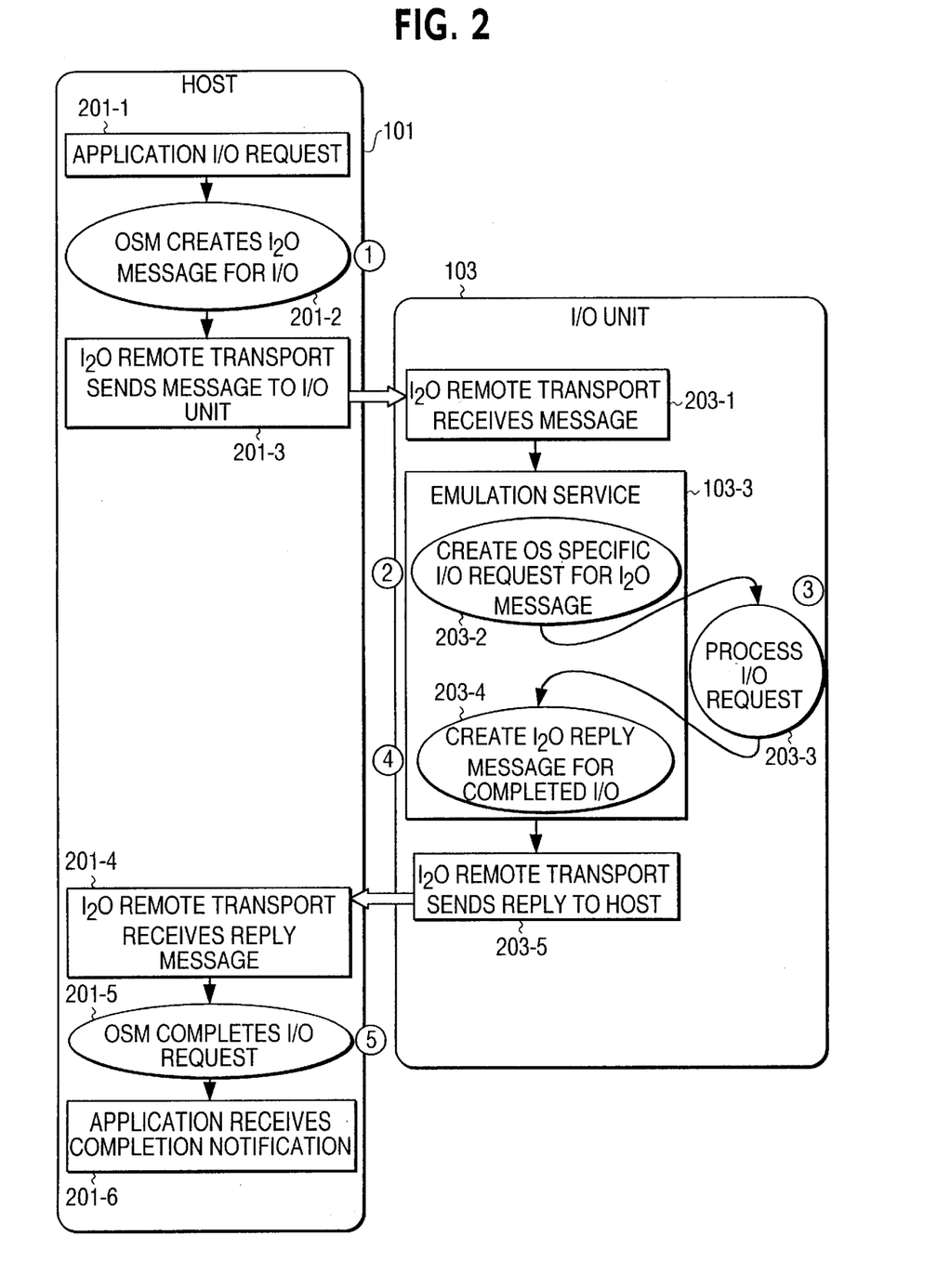
FIG. 2 is a flow diagram showing the flow of an I/O transaction through the emulated $I_2O$ unit in the example embodiment of FIG. 1 for an application I/O request.

FIG. 2 shows the flow of an I/O transaction through the emulated $I_2O$ unit in the example embodiment of FIG. 1 for an application I/O request. Generally, $I_2O$ requests originate on host 101, are transported over the SAN 104 to I/O unit 103 by the remote transport service, where they are processed. The emulation service operates on I/O unit 103 only, and requires no changes to the host system. The interface to the message service layer is preserved in the example embodiment to make the use of I/O unit 103 completely transparent to OSM 101-3.

The emulation process starts when application 101-1 of host 101 issues an I/O request (step 201-1). Then, OSM 101-3 creates an $I_2O$ message for the I/O request (step 201-2) and remote transport layer 101-4 sends the message (step 201-3) to be received by remote transport layer 103-4 of I/O unit 103 (step 203-1). Emulation service layer 103-3 of I/O unit 103 creates a series of I/O requests (step 203-2) corresponding to the $I_2O$ message that is specific to the operating system of I/O unit 103 (for example, a real-time operating system such as Ixworks). An application programming interface (API) of the operating system is utilized to accomplish the translation. The emulation service layer 103-3 performs the translation of the request, using the OS API to perform certain functions of the translation, such as mapping the buffers. Decoding the target, the requested function, and parameters of a request such as block offset and length of transfer, is done by the emulation service. The emulation service also uses the API of the OS to perform the I/O requests corresponding to the $I_2O$ request. The example embodiment of the invention is not limited to any particular operating system or API. Indeed, it is intended that the example embodiment can be applied to any non-$I_2O$ compliant I/O unit.

The operating system (i.e., device driver 103-2) and I/O adapter 103-1 of I/O unit 103 fully process the series of I/O requests and carry out the data transfer operations called for by $I_2O$ message (step 203-3). Upon completion, emulation service layer 103-3 creates an $I_2O$ reply message indicating that the data transfer is completed (step 203-4), which is sent by remote transport layer 103-4 to host 101 (step 203-5). Remote transport layer 101-4 then receives the reply message (step 201-4), OSM 101-3 completes the I/O request (step 201-5) and sends a completion notification to application 101-1 (step 201-6) that originated the I/O request at step 201-1. The $I_2O$ remote transport splits the message layer of the standard $I_2O$ driver stack between the host 101 generating the I/O requests and a target I/O unit 103, where the I/O requests are processed. The example embodiment of the invention replaces the portion of the $I_2O$ message layer on the I/O unit, emulating its behavior and interfacing with the remote transport as if it were a native $I_2O$ device.

There are two stages in emulating and processing the $I_2O$ messages. The subsystem configuration and operating parameters are retrieved and/or set in the first stage and the I/O requests are handled in the second stage. To properly emulate an I$_2$O I/O unit, the device must accept I$_2$O configuration messages as well as I/O request messages.

Figure 3:
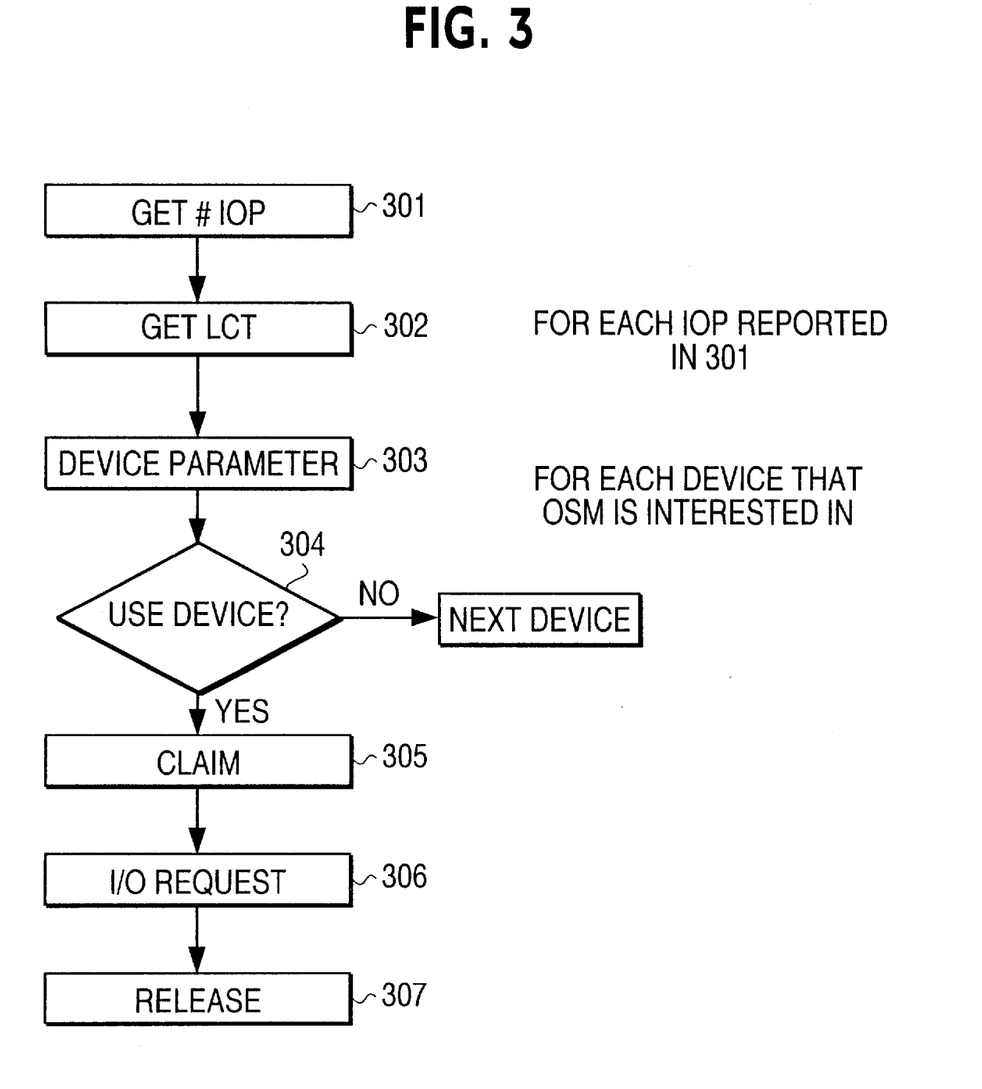
FIG. 3 is a flowchart of the initialization and configuration of the emulation service in the example embodiment of FIG. 1.
Figure 4A:
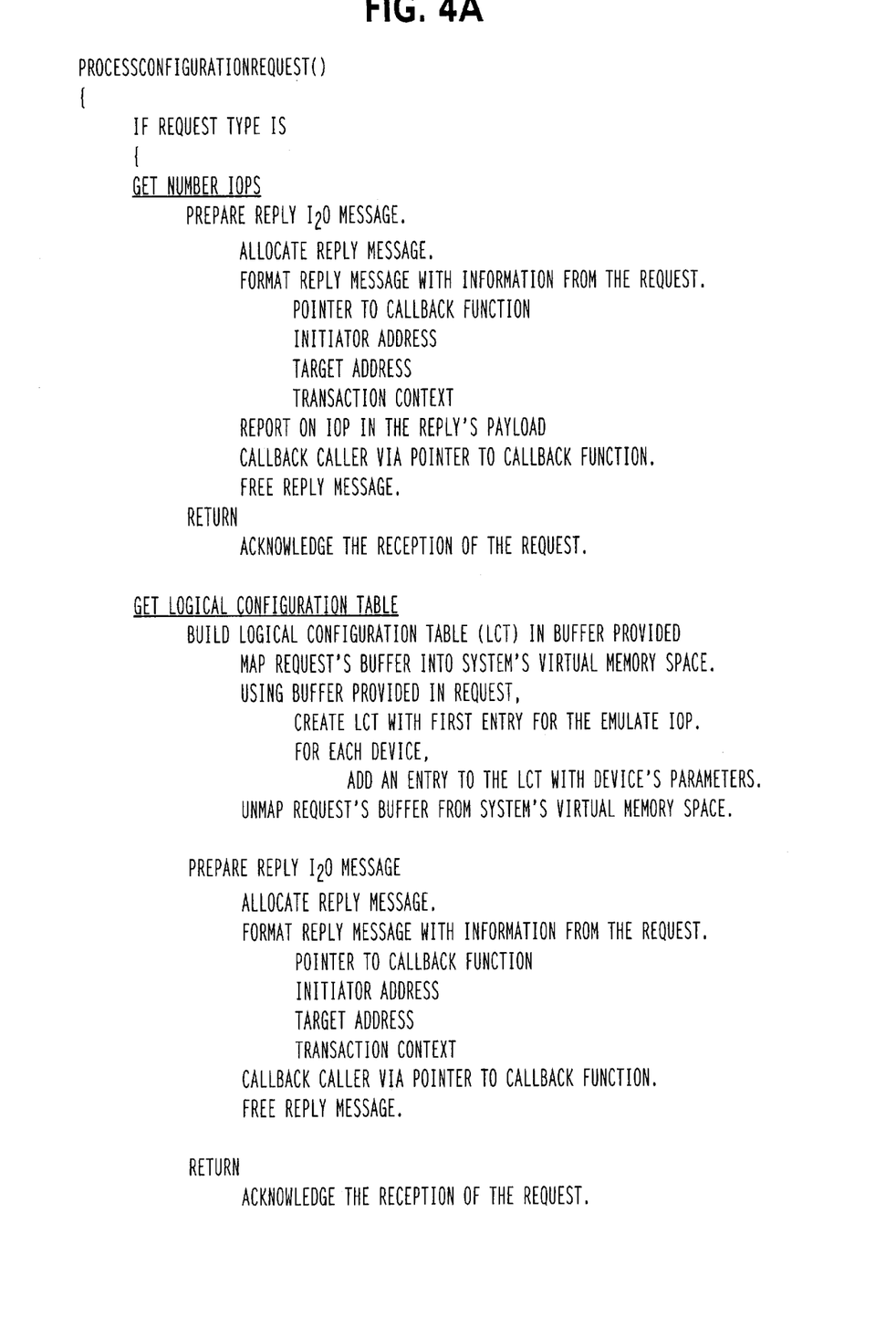
FIG. 4 provides pseudo-code of the flow control for initialization and configuration of the emulation service illustrated in FIG. 3.
Figure 4B:
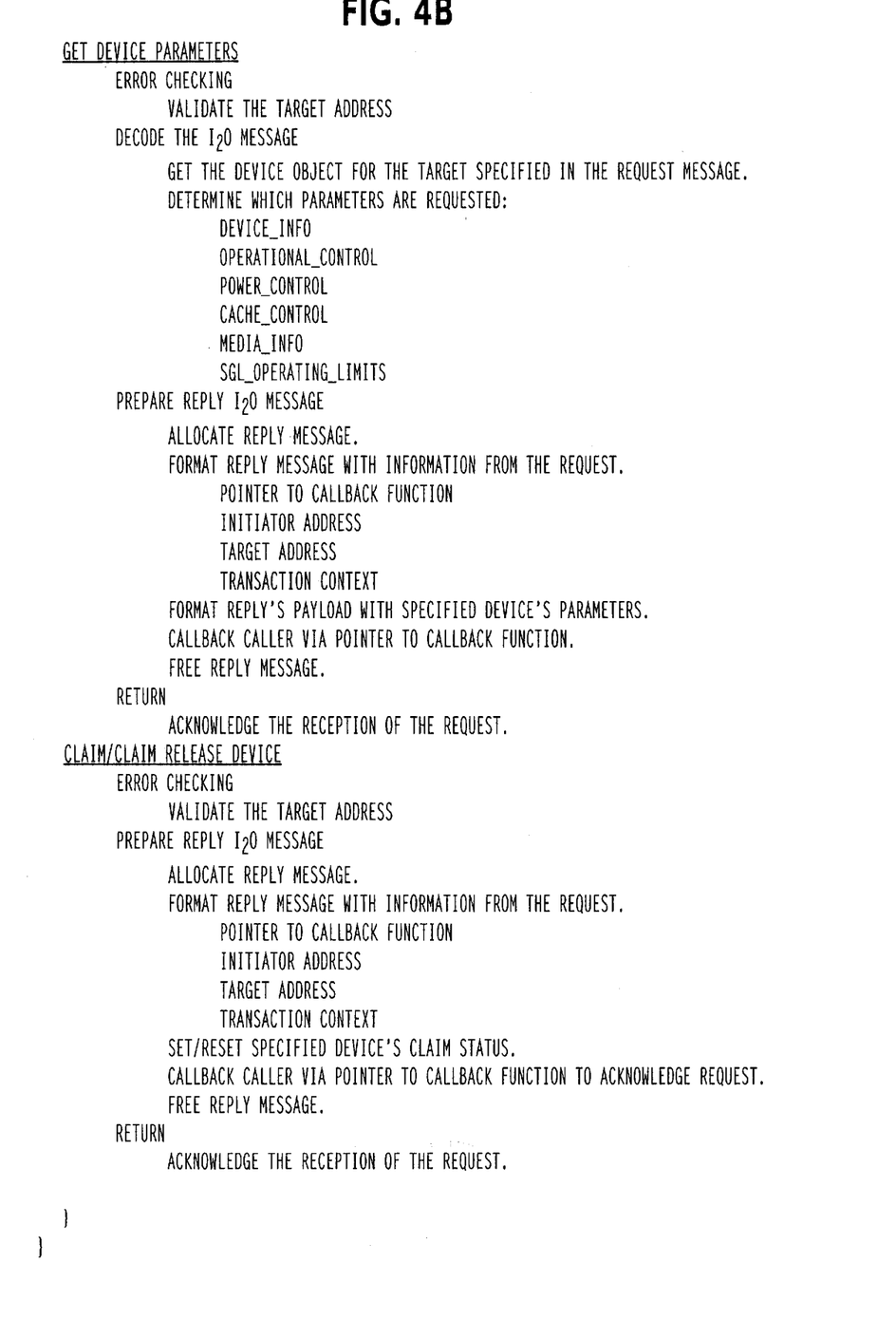

The configuration is not shown in FIG. 2 for the sake of simplicity and a flowchart thereof is provided in FIG. 3. At step 301, the host retrieves the number of emulated I/O processors (IOP) for all of the I/O adapters 103-1 in I/O unit 103. At step 302, it gets the logical configuration table (LCT) for each IOP reported in step 301. The device parameters are then obtained (step 303) for each device reported in the LCT that OSM 101-3 of host 101 is interested in. If a desired device is available for use (step 304), then that device is claimed (reserved) for use (step 305). I/O requests targeted at a claimed device are executed and completed (step 306) by one or more I/O operations. After all requested I/O operations complete, as indicated by the receipt of a completion notification for each request, the device can be released (step 307). Any number of I/O operation requests can be issued to a device while it is claimed; there is no minimum or maximum number that must be issued before releasing a device. Pseudo-code corresponding to the configuration process is provided in FIG. 4.

Once configured, the emulation service layer 103-3 can accept I$_2$O I/O requests and execute them asynchronously using operating system specific calls. Although shown as a single step in FIG. 2 for the sake of simplicity, the steps of processing an I/O request are shown in more detail in FIG. 5. In response to I/O request 201-1, parameters of the request such as the Target Address field and Function field are checked to make sure that they are within the bounds reported earlier in the LCT (step 501). An error message is returned (step 502) if they are not. If the parameters are valid, The emulation service layer 103-3 decodes and uses the TargetAddress field of the I$_2$O messages to associate a request with a target device, and decodes and uses the Function field of the I$_2$O message to determine the desired action for that message (step 503). The device specific parameters for the identified device are checked to determine whether or not they are valid (step 504). As an example, parameters such as the block offset and transfer size of a read or write operation are checked to make sure they are within the bounds of a disk drive. If they are not, an error message is returned (step 505). If the parameters are valid, then the buffers in I/O unit 103 are mapped (step 506) by using the physical addresses provided in the I$_2$O message such that OS specific I/O requests can be issued by the emulation service. A reply message is allocated for the I/O request (step 507) and the reply message is prepared (step 508).

Figure 5:
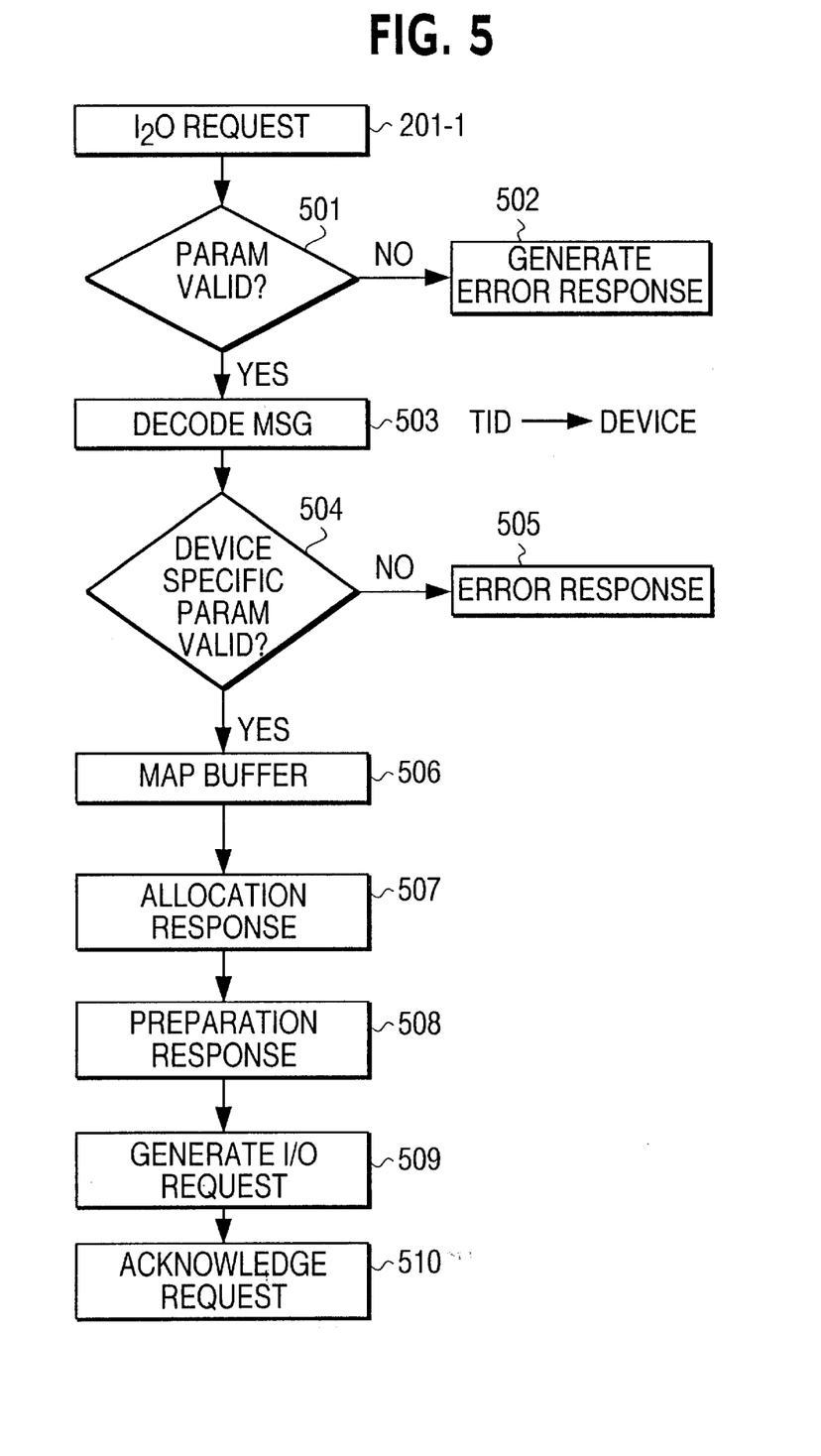
FIG. 5 is a flowchart of the I/O request processing in the emulation in the example embodiment of FIG. 1.

The desired function of the I$_2$O message is translated into a series of requests and data operations specific to the operating system of I/O unit 103 (step 509) and executed on the specified device. Translating I$_2$O requests into operating system specific I/O calls requires the ability to map the data buffers described by the I$_2$O message to a format suitable for I/O generation using the native operating system calls. Data buffers in an I$_2$O message are described in terms of physical memory locations. This is suitable for normal I$_2$O implementations where the I$_2$O hardware can access physical memory directly. To retain the ability of using standard I/O calls, the buffer described by the I$_2$O message must be mapped into system virtual address space before it can be used to generate an I/O. Mapping the buffer creates a buffer in the system's virtual address space that represents the physical memory specified by the I$_2$O message without requiring additional memory allocation and memory copy operations. As shown in FIG. 5, the I/O request is acknowledged (step 510) after the above steps are taken.

Figure 6:
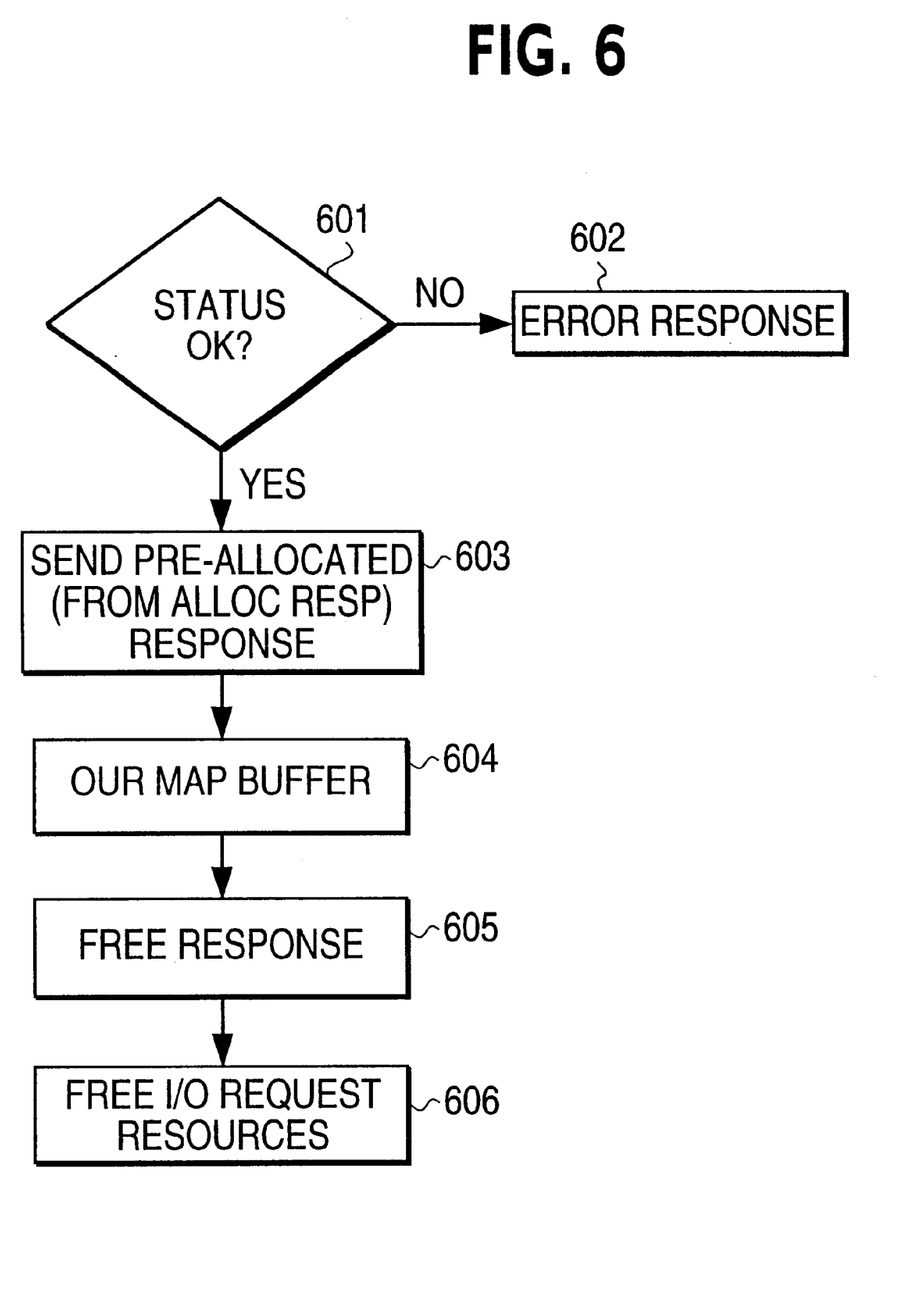
FIG. 6 is a flowchart of the I/O completion notification process in the example embodiment of FIG. 1.
Figure 7A:
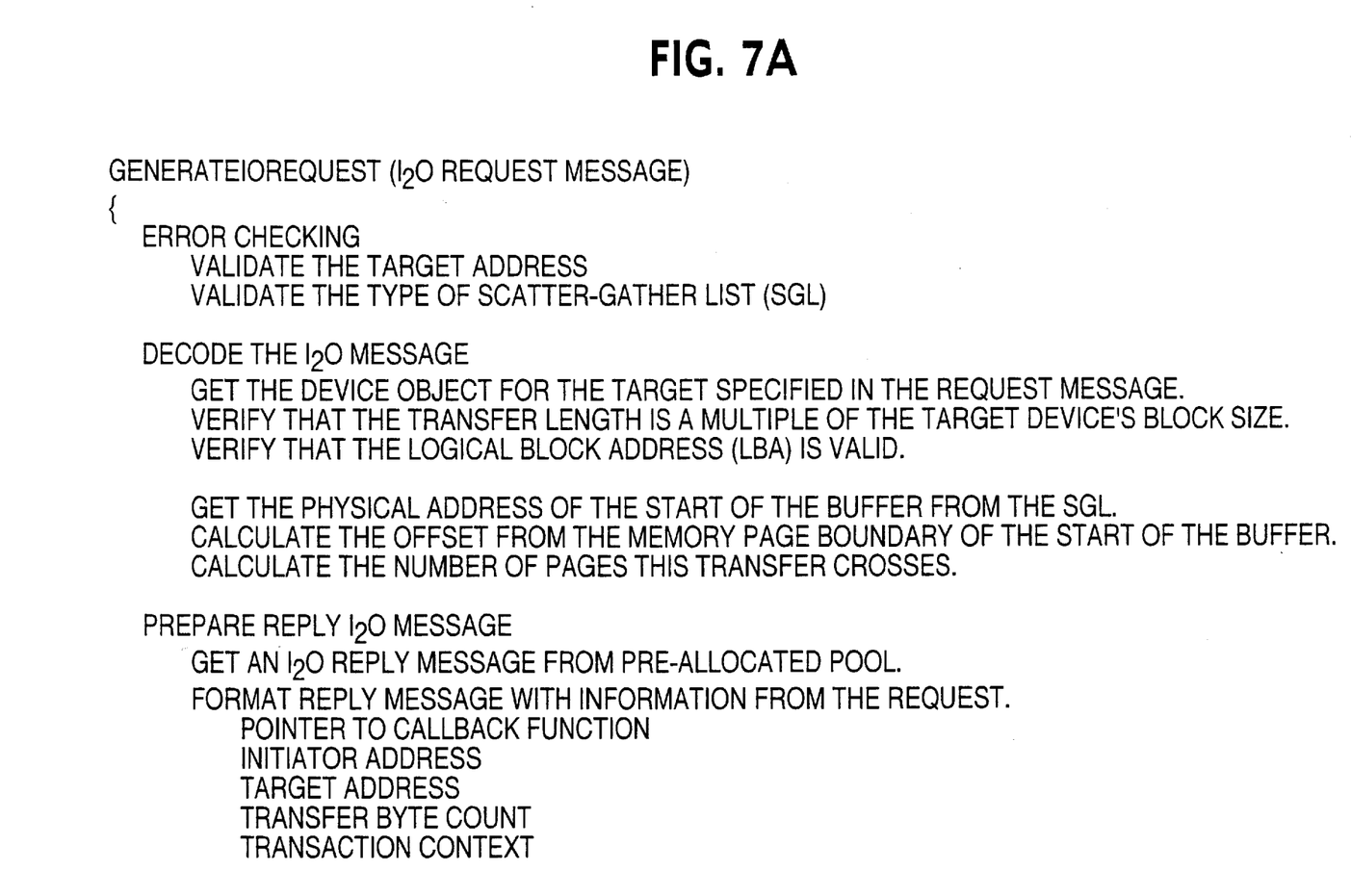
FIG. 7 provides pseudo-code of the internal flow control for I/O generation and of the I/O completion notification process illustrated in FIGS. 5 and 6, respectively.
Figure 7B:
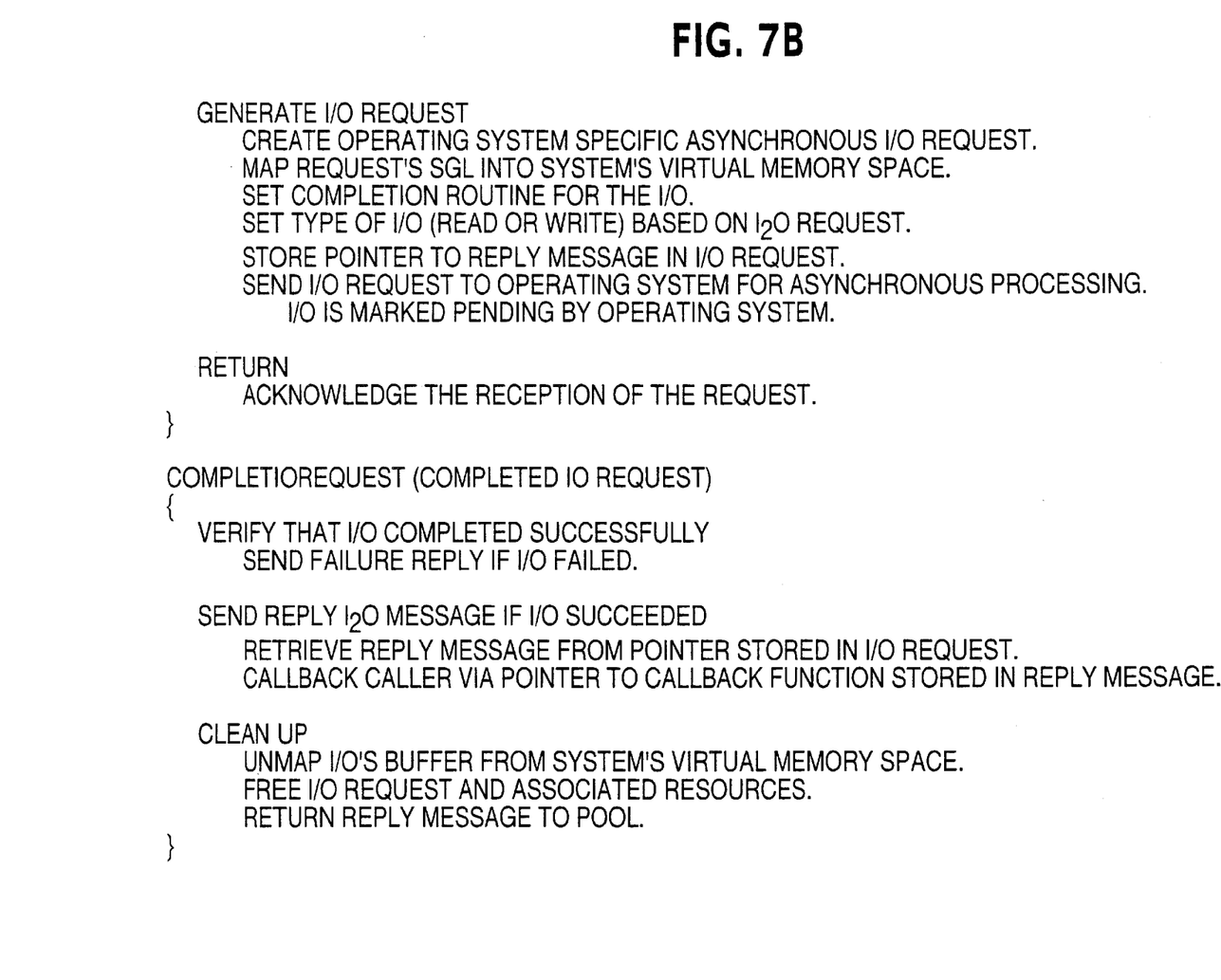

Similar to native I$_2$O drivers, the emulation service layer 103-3 uses completion routines for signaling message-processing completions as shown in FIG. 6. At first, the status of the I/O request is checked to verify that it completed successfully (step 601) and an error message is generated if it did not. If it completed successfully, a pre-allocated response is sent to host 101 (step 603). Before terminating, the buffers mapped in the system's virtual address space as described with respect to step 508 are unmapped (step 604), the I/O request is freed (step 605), and the resources associated with the I/O request are freed (step 606). A pseudo-code for the I/O processing in FIG. 5 and the completion routine in FIG. 6 is provided in FIG. 7.

The example embodiment, including the completion routine, facilitates a non-blocking, asynchronous usage model that is ideally suited for kernel mode implementations, such as in a NGIO/VI network. Of course, the network and connected devices are not limited to the example embodiment and non-I$_2$O I/O units may implement different embodiments of the invention. Indeed, an advantage of the exemplary embodiment of the invention is that it is particularly useful and widely adaptable to hardware in any non-I$_2$O I/O unit having latency in data transfer operations so that it can emulate a more efficient message passing protocol.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A method of transferring data to or from an input/output unit across a network, said method comprising:

sending a message from a host device to said input/output unit, said message specifying a requested data transfer and being formatted in accordance with a message passing protocol;

in an emulation service software layer on said input/output unit, translating said message into a corresponding series of data transfer operation instructions, said series of data transfer operation instructions being of a format other than said message passing protocol;

performing said data transfer specified by said message in the operating system and hardware of a target device in the input/output unit using said series of data transfer operation instructions;

upon completion of the data transfer, creating a reply message in said emulation service software layer and sending said reply message to said host device in a format according to said message passing protocol.

2. The method recited in claim 1, wherein said series of data transfer operation instructions identifies and maps a set of buffers in the input/output unit which are utilized when performing the data transfer.

3. The method recited in claim 2, wherein the set of buffers are unmapped after the reply message is sent to said host device.

4. The method recited in claim 1, wherein the message specifying a requested data transfer is formatted in accordance with the message passing protocol by a module in the operating system of the host device.

5. The method recited in claim 4, wherein the operating system of the host device sends a completion notification to a user application utilizing a non-blocking, asynchronous usage model operating in kernel space.

6. The method recited in claim 5, wherein the data transfer is made over a virtual interface of the network.

7. The method recited in claim 6, wherein the message passing protocol is compliant with Version 1.5 of $I_2O$.

8. An input/output unit connected to a host device across a network, said input/output unit configured to carry out a data transfer method in response to a message from the host device comprising:

receiving a message sent from a host device, said message specifying a requested data transfer and being formatted in accordance with a message passing protocol;

in an emulation service software layer, translating said message into a corresponding series of data transfer operation instructions, said series of data transfer operation instructions being of a format other than said message passing protocol;

performing said data transfer specified by said message in the operating system and hardware of a target device using said series of data transfer operation instructions;

upon completion of the data transfer, creating a reply message in said emulation service software layer and sending said reply message to said host device in a format according to said message passing protocol.

9. The input/output unit recited in claim 8, wherein said series of data transfer operation instructions identifies and maps a set of buffers which are utilized when performing the data transfer.

10. The input/output unit recited in claim 9, wherein the set of buffers are unmapped after the reply message is sent to said host device.

11. The input/output unit recited in claim 8, wherein the data transfer is made over a virtual interface between the input/output unit and the network.

12. The input/output unit recited in claim 11, wherein the data is transferred directly between the input/output unit and the memory of a host device over a virtual interface without making an intermediate copy of the data.

13. The input/output unit recited in claim 12, wherein the input/output unit further comprises a software stack having transport layers to effectuate the transfer of data across the network and the translation of the message is transparent to the transport layers.

14. The input/output unit recited in claim 13, wherein the input/output unit comprises a storage adapter having a plurality of block storage data recording media.

15. A tangible medium storing a plurality of program instructions, said program instructions causing an input/output unit to transfer data with a host device across a network, the data transfer comprising:

receiving a message sent from a host device, said message specifying a requested data transfer and being formatted in accordance with a message passing protocol;

in an emulation service software layer, translating said message into a corresponding series of data transfer operation instructions, said series of data transfer operation instructions being of a format other than said message passing protocol;

performing said data transfer specified by said message in the operating system and hardware of a target device using said series of data transfer operation instructions;

upon completion of the data transfer, creating a reply message in said emulation service software layer and sending said reply message to said host device in a format according to said message passing protocol.

16. The tangible medium recited in claim 15, wherein said series of data transfer operation instructions identifies and maps a set of buffers in the input/output unit which are utilized when performing the data transfer.

17. The tangible medium recited in claim 16, wherein the set of buffers are unmapped after the reply message is sent to said host device.

18. The tangible medium recited in claim 15, wherein the data transfer is made over a virtual interface between the input/output unit and the network.

19. The tangible medium recited in claim 18, wherein the data is transferred directly between the input/output unit and the memory of a host device over a virtual interface without making an intermediate copy of the data.

20. The tangible medium recited in claim 19, wherein the input/output unit further comprises a software stack having transport layers to effectuate the transfer of data across the network and the translation of the message is transparent to the transport layers.

* * * * *